United States Patent [19]
Nakamura et al.

[11] 3,764,817
[45] Oct. 9, 1973

[54] VEHICLE SPEED DETECTOR FOR USE WITH SKID CONTROL SYSTEMS

[75] Inventors: Hiromichi Nakamura; Kosaku Baba, both of Yokohama, Japan

[73] Assignee: Nissan Motor Company, Limited, Yokohama City, Japan

[22] Filed: Nov. 9, 1971

[21] Appl. No.: 197,042

[30] Foreign Application Priority Data
Nov. 16, 1970 Japan............................ 45/100429

[52] U.S. Cl............. 307/10 R, 303/21 BE, 303/20, 317/5, 340/52 R
[51] Int. Cl............................................. B60t 8/06
[58] Field of Search ..................... 303/21 BE, 21 P, 303/20; 317/5; 307/10 R; 188/181; 340/52 R, 262, 263

[56] References Cited
UNITED STATES PATENTS

| | | | |
|---|---|---|---|
| 3,640,589 | 2/1972 | Taniguchi | 303/20 UX |
| 3,650,575 | 3/1972 | Okamoto | 303/20 UX |
| 3,606,490 | 9/1971 | Ando | 340/262 UX |
| 3,640,588 | 2/1972 | Carp et al. | 303/20 X |
| 3,578,819 | 5/1971 | Atkins | 303/21 BE |

*Primary Examiner*—Herman J. Hohauser
*Attorney*—John Lezdey

[57] ABSTRACT

A vehicle speed detector for use with a skid control system which comprises a capacitor to be charged by the wheel speed signal and a constant-current discharging circuit for discharging the capacitor by flowing therethrough a constant-current as long as the solenoid valve is de-energized. The voltage across the terminals of the capacitor is utilized as the output vehicle speed signal of the detector.

5 Claims, 5 Drawing Figures

VEHICLE SPEED DETECTOR FOR USE WITH SKID CONTROL SYSTEMS

This invention generally relates to skid control systems and, more particularly, to a vehicle speed detector for use with a skid control system for producing a hypothetical vehicle speed signal.

One of the major difficulties which arises in braking a moving vehicle, such as an automobile, an aircraft or other wheeled vehicle, occurs when the braking wheel, or wheels, skid or slide, this skid tending to create an unstable condition in the controlled motion of the vehicle. Wheel lock-up causes such a loss in directional stability as to result in an uncontrolled skidding or sliding while at the same time the presence of locked wheels generally increases the distance required to stop due to the reduced coefficient of friction while skidding. Under most road conditions, if skidding can be prevented, the vehicle can usually be stopped more safely in a shorter distance.

Various skid control system have been involved which are effective under various road conditions to minimize stopping distance while maximizing the directional stability of the vehicle. Some of them can effectively avoid a skid condition of a vehicle by permitting spin up of the wheels. This is accomplished by generating a vehicle speed signal representative of the vehicle speed, which is compared with a wheel speed signal representative of the wheel speed so as to derive a critical slip ratio signal. This critical slip ratio is defined as a ratio of a preselected magnitude of variation of the wheel speed from the vehicle speed to the vehicle speed.

A difficulty is, in this instance, encountered in determining the vehicle speed although the wheel speed may be readily determined through a rotational speed of the propeller shaft or the like.

It is therefore an object of this invention to provide an improved vehicle speed detector for use with a skid control system.

Another object of this invention is to provide a vehicle speed detector for a skid control system which is operable notwithstanding variation of the coefficient of friction $\mu$ between the surfaces of the wheel and the road.

Further objects, features and advantages of this invention will become apparent from a consideration of the following description, the appended claims, and the accompanying drawings in which:

Figure 1:
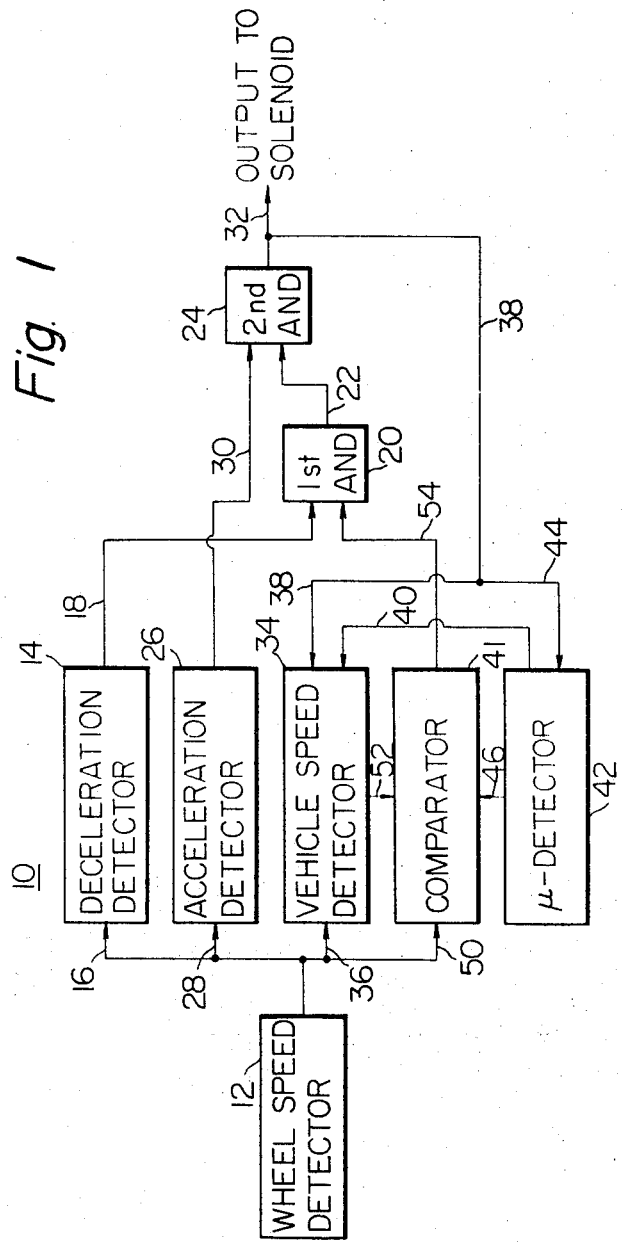
FIG. 1 is a schematic block diagram of a skid control system utilizing a vehicle speed detector according to this invention.

Referring now to the drawings and particularly to FIG. 1 thereof, there is illustrated a skid control system 10 which includes a wheel spaced detector 12 producing a wheel speed signal representative of the wheel speed. A deceleration detector 14 is adapted to receive through a line 16 the wheel speed signal from the wheel speed detector 12 and produce a logical "ON" signal when the deceleration of the wheel speed exceeds a predetermined value. This "ON" signal is applied through a line 18 to one input of a first AND gate 20. An output of the first AND gate 20 is applied through a line 22 to one input of a second AND gate 24. An acceleration detector 26 is adapted to receive through a line 28 the wheel speed signal and produce a logical "OFF" signal when the acceleration of the wheel exceeds a predetermined value. This "OFF" signal is applied through a line 30 to the other input of the second AND gate 24. An output of the AND gate 24 is connected through a line 32 to a solenoid (not shown) of a solenoid valve which is adapted to release the brake pressure when the solenoid is energized by an "ON" signal. A vehicle speed detector 34 of this invention is used in this system and receives the wheel speed signal from the wheel speed detector through a line 36. The vehicle speed detector further receives through a line 38 the output signal of this system 10 and through a line 40 a $\mu$-signal representative of the coefficient of friction $\mu$ from a $\mu$-detector 42. This vehicle speed detector 34 then produces an approximate vehicle speed signal which is approximated by equal to the actual vehicle speed. The $\mu$-detector 42 receives through a line 44 the output signal of this system and produces the $\mu$-signal having a voltage proportional to the coefficient of friction $\mu$. The $\mu$-signal is also applied through a line 46 to a comparator 41 which on the other hand receives through a line 50 the wheel speed signal and through a line 52 the approximate vehicle speed signal from the vehicle speed detector 34. The comparator 41 compares the approximate vehicle speed signal with the wheel speed signal and produces a logical "ON" signal when the difference between the vehicle speed signal and the wheel speed signal exceeds a value predetermined in accordance with the $\mu$-signal. The output of the comparator 41 is applied through a line 54 to the other input of the first AND gate 20.

The operation of the system of FIG. 1 is hereinbelow explained in conjunction with FIG. 2.

Figure 2:
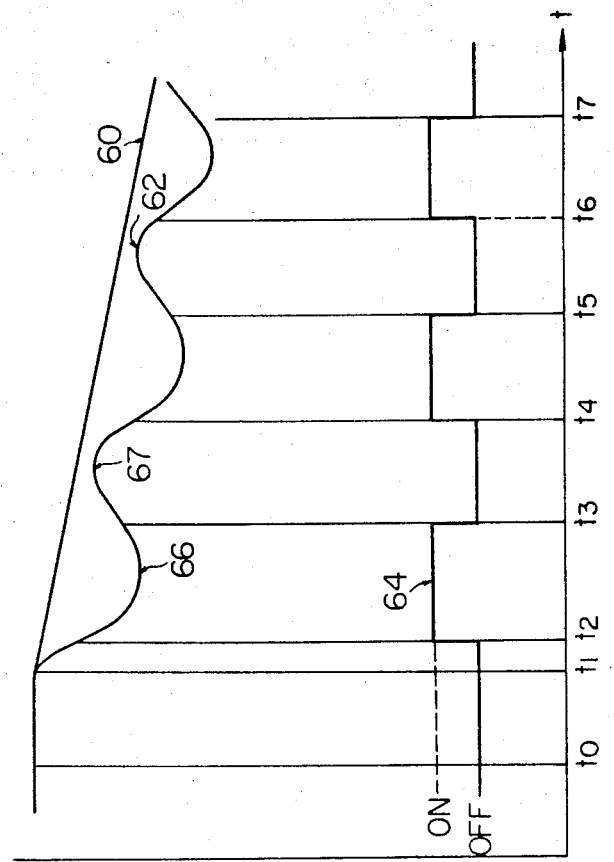
FIG. 2 is a diagram illustrating variations, in terms of time, of the vehicle speed, wheel speed and brake pressure of a vehicle under skid control.

Referring to FIG. 2, it is seen that the vehicle speed initially starts as a flat constant velocity which commences deceleration at a time $t_1$ as shown by a line 60, while the wheel speed runs down as shown by a curved line 62. The deceleration detector 14 then produces "ON" signal which is applied to one input of the first AND gate 20. The difference between the vehicle speed and the wheel speed reaches a predetermined value at a time $t_2$, the comparator produces "ON" signal which is applied through the line 54 to the other input of the first AND gate 20. Since one "ON" signal is already applied to the one input of the first AND gate, the first AND gate produces "ON" signal which is then applied through the line 22 to one input of the second AND gate 24. The second AND gate also receives through the other input "ON" signal from the acceleration detector 26 and thus the second AND gate produces "ON" signal on its output. The output "ON" signal is applied through the line 32 to the solenoid of the solenoid valve which then actuates to release the brake pressure. Even if the brake pressure is reduced, the wheel speed continues to run down toward a first minimum velocity point 66 due to the time-lag of the braking apparatus. Upon completion of removal of the braking force, the wheel speed commences acceleration. When the wheel speed thereafter reaches a predetermined value at a time $t_3$, the acceleration detector 26 produces "OFF" signal which is applied through the line 30 to the second AND gate 24. Upon receipt of "OFF" signal from the acceleration detector, output signal of the second AND gate turns to "OFF" signal which then de-energizes the solenoid permitting reapplication of the braking pressure. Even if the brake pressure is reapplied, the wheel speed continues to spin up toward the second maximum point 67 due to the time-lag of the braking apparatus. The same operations as above-mentioned are repeated until the vehicle velocity becomes zero.

It is now apparent from FIG. 2 that the length of the time period when the solenoid is energized, for example, from $t_2$ to $t_3$, $t_4$ to $t_5$, and $t_6$ to $t_7$ is inversely proportional to the magnitude of the coefficient of friction. The $\mu$-detector therefore produces the $\mu$-signal by inverting the average value of the time periods when the solenoid is energized.

Figure 3:
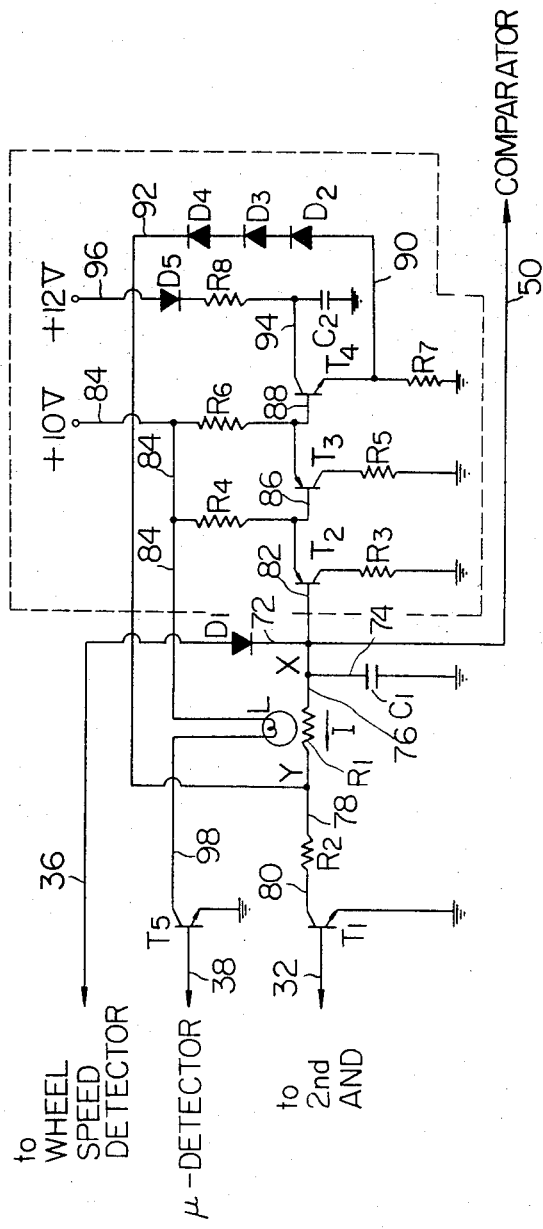
FIG. 3 is a diagram illustrating a circuit arrangement of a vehicle speed detector according to this invention.

In FIG. 3, a preferred circuit arrangement of the vehicle speed detector 34 shown in FIG. 1, which comprises a diode $D_1$ having an anode connected through a line 36 to the wheel velocity detector 12 and a cathode connected through a line 72, a joint X and a line 74 to a capacitor $C_1$ which is in turn connected to ground. The joint X is connected through a line 76 to one terminal of a resistor $R_1$ the other terminal of which is connected through a joint Y and a line 78 to one terminal of a resistor $R_2$. The resistor $R_1$ is made of a photo-conductive material. The other terminal of the resistor $R_2$ is connected through the line 80 to a collector of a transistor $T_1$ of NPN type whose emitter is grounded. The base of the transistor $T_1$ is connected through a line 32 and an inverter (not shown) to the second AND gate. The joint X is also connected through a line 82 to the base of a transistor $T_2$ of PNP type. The collector of the transistor $T_2$ is grounded through a resistor $R_3$. The emitter of the transistor $T_2$ is connected through a resistor $R_4$ and a line 84 to a positive power source of 10V, and also connected through a line 86 to the base of a transistor $T_3$ of PNP type. The collector of the transistor $T_3$ is grounded through a resistor $R_5$ and the emitter is connected through a resistor $R_6$ and the line 84 to the positive power source of +10V. The emitter of the transistor $T_3$ is also connected through a line 88 to the base of a transistor $T_4$ of NPN type whose emitter is grounded through a resistor $R_7$. The emitter of the transistor $T_4$ is also connected through a line 90 to the anode of a diode $D_2$ whose cathode is connected to the anode of a diode $D_3$. The cathode of the diode $D_3$ is connected to the anode of a diode $D_4$ whose cathode is connected through a line 92 to the junction Y. The collector of the transistor $T_4$ is connected through a line 94 to a capacitor $C_2$ which is in turn grounded. The collector of the transistor $T_4$ is also connected through the line 94 and a resistor $R_8$ to the cathode of a diode $D_5$ whose anode is connected through a line 96 to another positive power source of +12V. A lamp L is provided having one terminal connected through the line 84 to the positive power of +10V. The other terminal of the lamp L is connected through a line 98 to the collector of a transistor $T_5$ whose emitter is grounded. The base of the transistor $T_5$ is connected through a line 38 to the $\mu$-detector 42. The lamp L is so placed that the resistor $R_1$ is irradiated by the light from the lamp L. The joint X is connected through a line 52 to the comparator 41.

The operation of the circuit of FIG. 3 is hereinbelow described in conjunction with FIG. 4.

Figure 4:
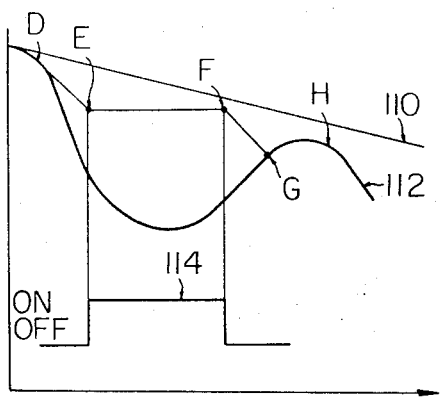
FIG. 4 and 5 are diagrams showing various hypothetical signals produced by a vehicle speed detector of this invention.

In FIG. 4, the variation of the actual vehicle speed and the wheel speed signal produced by the wheel speed detector are illustrated by lines 110 and 112 to the same voltage scale. The output signal of the second AND gate 24, which is applied through the inverter to the base of the transistor $T_1$, is shown by a line 114 in the lower portion. When, the normal running condition, the wheel speed signal having a voltage $V_w$ is applied through the line 36 and the diode $D_1$ to the capacitor $C_1$, the capacitor $C_1$ is charged by the voltage $V_w$. In this instance, it is to be noted that the voltage $V_w$ is high enough to charge up the capacitor $C_1$ although the transistor $T_1$ is conductive because of "OFF" signal for the output of the second AND gate and a discharging current I flows through the resistor $R_1$ and $R_2$ and the transistor $T_1$. When, however, the motor vehicle is braked and the wheel speed commences to decelerate, the voltage $V_w$ is reduced thereby to permit the capacitor to be discharged by the discharging current I so that the potential at the joint X lowers as shown by a line D–E.

If, in this instance, the potential at the joint X is assumed to be $V_x$, potentials $V_{e1}$, $V_{e2}$ and $V_{e3}$ at each emitter of the transistors $T_2$, $T_3$ and $T_4$ is expressed as follows:

$$V_{e1} = V_x + V_{d1}$$
$$V_{e2} = V_x + V_{d1} + V_{d2}$$
$$V_{e3} = V_x + V_{d1} + V_{d2} - V_{d3}$$

where, $V_{d1}$, $V_{d2}$ and $V_{d3}$ respctively represent the voltage drop across the base and emitter of each of the transistors $T_1$, and $T_2$ and $T_3$. Furthermore, the potential $V_y$ at the joint Y is expressed as follows:

$$V_y = V_x + V_{d1} + V_{d2} - V_{d3} - 3V_d$$

where, $V_d$ represents the voltage drop across the anode and the cathode of each of the diodes $D_2$, $D_3$ and $D_4$.

It is now important that the voltage drop across the base and the emitter of a transistor is substantially constant when the transistor is sufficiently forward-biased. The same description is applicable to diode. Furthermore, the following equation can be assumed:

$$V_{d1} = V_{d2} = V_{d3} = V_d$$

Hence, the potential $V_y$ is expressed as:

$$V_y = V_x - 2V_d$$

Therefore, the voltage drop across the joints X and Y is constantly $2V_d$, and namely, the circuit surrounded by a dotted line in FIG. 3 act as a constant voltage circuit maintaining constant the voltage drop across the joints X and Y. This constant-voltage circuit may be replaced by any other constant-voltage circuit, if desired. Since resistance of the resistor $R_1$ is sufficiently larger than that of the resistor $R_2$, the discharging current I is kept substantially constant with the result that the potential $V_x$ lowers linearly as shown by the linear line D–E.

When, in this instance, the output signal of the second AND gate is turned to "ON," the transistor $T_1$ becomes nonconductive so that the discharging current I becomes zero thereby to keep the potential $V_x$ constant as shown by a line E–F. After a while, the output signal is turned to "OFF" whereby the transistor $T_1$ becomes conductive so that the potential $V_x$ is lowered as shown by a line F–G. Since the discharging current is held at I, the inclination of the line F–C is equal to that of the line D–E. At the point G, the voltage $V_w$ exceeds the potential $V_x$, the capacitor $C_1$ is charged by the voltage $V_w$ and the voltage $V_x$ varies as the segment G–H. The potential $V_x$ therefore repeats the variation as shown by the line D–E–F–G–H until the vehicle speed becomes zero.

It is now apparent that the variation D–E–F–G–H of the potential $V_x$ is approximated to the actual vehicle speed. The potential $V_x$ is therefore usable as the approximate vehicle speed signal which is applied through the line 50 to the comparator.

Figure 5:
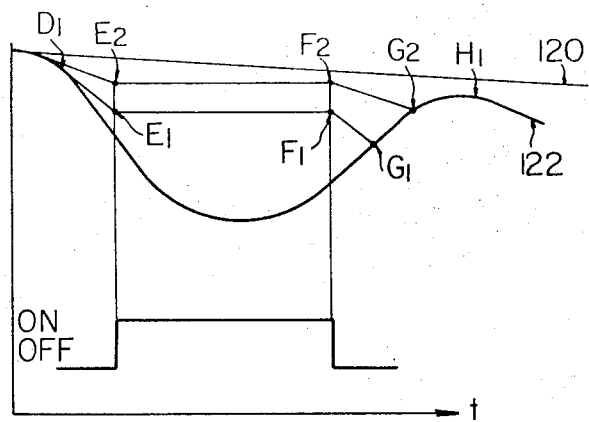

When, in this instance, the coefficient of friction $\mu$ decreases, the rate of change of the actual vehicle speed should be reduced as shown by a line 120 in FIG. 5. The wheel speed accordingly varies as shown by a line 122. If the resistance of the resistor $R_1$ does not change, then the potential $V_x$ varies as a line $D_1$– $E_2$– $F_2$– $G_2$– $H_1$. If the resistance of the resistor $R_1$ is increased, then the potential $V_x$ varies as shown by a line $D_1$ –$E_1$ –$F_1$ –$G_1$ –$H_1$. It is therefore preferable to change the resistance of the resistor $R_1$ so that it is inversely proportional to the magnitude of the coefficient of friction $\mu$.

The resistor $R_1$ is therefore made of a photoconductive material and the lamp L is so placed as to face the resistor $R_1$. When the $\mu$-signal from the $\mu$-detector is applied through the line 38 to the base of the transistor $T_5$, the lamp L emits a light having an intensity proportional to the magnitude of the coefficient of friction $\mu$. Since the resistor $R_1$ is photoconductive, the resistance of the resistor $R_1$ varies in inversely a manner proportional to the magnitude of the coefficient of friction $\mu$.

It should be understood that the resistor $R_1$ of photoconductive material and the lamp L may be substituted by another type of resistor and a controllable energy source, such as, a magnetic resistive element and an electric magnet. In addition, such a modification is applicable to the resistor $R_2$.

It will now be appreciated from the foregoing description that the vehicle speed detector according to this invention is adapted to produce a vehicle speed signal desiredly approximated to the actual vehicle speed notwithstanding the great variation of the coefficient of friction between the surfaces of the wheel and the road.

Obviously many modifications and variations of this invention are possible in the light of the above teachings. It is therefore to be understood that within the scope of the appended claims the invention may be practiced otherwise than as specifically described.

What is claimed is:

1. A vehicle speed detector for use with a skid control system producing an output signal representative of the application and release of the brake pressure, and including a vehicle wheel speed detector producing a wheel speed signal having a voltage proportional to the wheel speed and $\mu$-detector producing a $\mu$-signal having a voltage proportional to the friction coefficient between the surfaces of the wheels and the road in response to said output signal from the skid control system, which vehicle speed detector comprises:

a capacitor charged by said wheel speed signal from said wheel speed detector;

a constant-current discharging circuit for discharging said capacitor by flowing therethrough a constant current in response to said output signal from the skid control system; and a control circuit responsive to said $\mu$-signal to keep the discharging current of said capacitor constant notwithstanding the variation of the friction coefficient, whereby a voltage signal across said capacitor may be representative of a vehicle speed signal approximated to the actual vehicle speed.

2. A vehicle speed detector according to claim 1, in which said capacitor is grounded at one terminal, and said constant-current discharging circuit inlcudes a first resistor having one terminal connected to the other terminal of said capacitor, a second resistor having one terminal connected to the other terminal of said first resistor, a transistor having a collector connected to the other terminal of said second resistor, an emitter which is grounded and a base adapted to receive said output signal from the skid control system, and a constant-voltage circuit connected to the terminals of said first resistor for maintaining the voltage drop of said first resistor constant.

3. A vehicle speed detector according to claim 2, wherein said control circuitry includes a means for varying the resistance of said first resistor in a manner inversely proportional to the magnitude of the friction coefficient.

4. A vehicle speed detector according to claim 3, wherein said first resistor is a photo-conductive resistor, and said means is a lamp for irradiating said photoconductive resistor with light having an intensity proportional to the voltage of said $\mu$-signal.

5. A vehicle speed detector according to claim 4, in which said lamp has one terminal connected to a d.c. power source and the other terminal connected to a collector of a transistor having an emitter which is grounded and a base connected to said $\mu$-detector.

* * * * *